United States Patent
Antinori et al.

(10) Patent No.: US 12,519,649 B2
(45) Date of Patent: Jan. 6, 2026

(54) IMAGE FINGERPRINTING BASED ON FUZZY HASHING

(71) Applicant: RED HAT, INC., Raleigh, NC (US)

(72) Inventors: Paolo Antinori, Novara (IT); Stefano Maestri, Cremona (IT)

(73) Assignee: Red Hat, Inc., Charlotte, NC (US)

( * ) Notice: Subject to any disclaimer, the term of this patent is extended or adjusted under 35 U.S.C. 154(b) by 0 days.

(21) Appl. No.: 18/732,959

(22) Filed: Jun. 4, 2024

(65) Prior Publication Data
US 2025/0373438 A1   Dec. 4, 2025

(51) Int. Cl.
*H04L 9/32* (2006.01)

(52) U.S. Cl.
CPC .................. *H04L 9/3236* (2013.01)

(58) Field of Classification Search
None
See application file for complete search history.

(56) References Cited

U.S. PATENT DOCUMENTS

| | | | |
|---|---|---|---|
| 11,042,637 B1 * | 6/2021 | Davis | G06F 21/121 |
| 2012/0324446 A1 | 12/2012 | Fries et al. | |
| 2015/0317325 A1 * | 11/2015 | Key | G06F 16/152 |
| | | | 707/770 |
| 2020/0099684 A1 * | 3/2020 | Nagaraja | G06F 21/45 |
| 2021/0056204 A1 * | 2/2021 | Singh | G06F 21/565 |
| 2024/0168743 A1 | 5/2024 | Xu et al. | |

OTHER PUBLICATIONS

European Search Report, 24221835.2, Mar. 27, 2025, 10 pages.

* cited by examiner

*Primary Examiner* — Nelson S. Giddins
(74) *Attorney, Agent, or Firm* — Kilpatrick Townsend & Stockton LLP

(57) ABSTRACT

In one example, a method may detect and notify a user of comparisons between image files for execution in a distributed computing environment. The method includes receiving an image file for deploying software, where the image contains metadata and a plurality of layers. The method may then normalize the metadata to produce normalized metadata. The method may then generate hashed metadata by applying a first fuzzy hashing function to the normalized metadata. The method may further generate hashed layers by applying a second fuzzy hashing function to the plurality of layers of the image file. The method may then generate a first fingerprint for the image file based on the hashed metadata and the hashed layers. Then, the methods may determine a similarity between the first fingerprint and a second fingerprint by comparing the first fingerprint to the second fingerprint.

20 Claims, 7 Drawing Sheets

IMAGE FINGERPRINTING BASED ON FUZZY HASHING

TECHNICAL FIELD

The present disclosure relates generally to fingerprinting data in distributed computing environments. More specifically, but not by way of limitation, this disclosure relates to image fingerprinting based on fuzzy hashing.

BACKGROUND

Distributed computing environments are increasingly popular. In a distributed computing environment, there can be many applications deployed from image files, which are also sometimes referred to as just "images" for simplicity. Image files can be stand-alone executable files used to deploy applications across the distributed computing environment. Examples of such image files can be Open Container Initiative (OCI) image files or Docker image files. Image files are often composed of multiple layers and may contain metadata, such as authors, timestamps, file paths, file permissions, and other data associated with the image.

DETAILED DESCRIPTION

Figure 1:
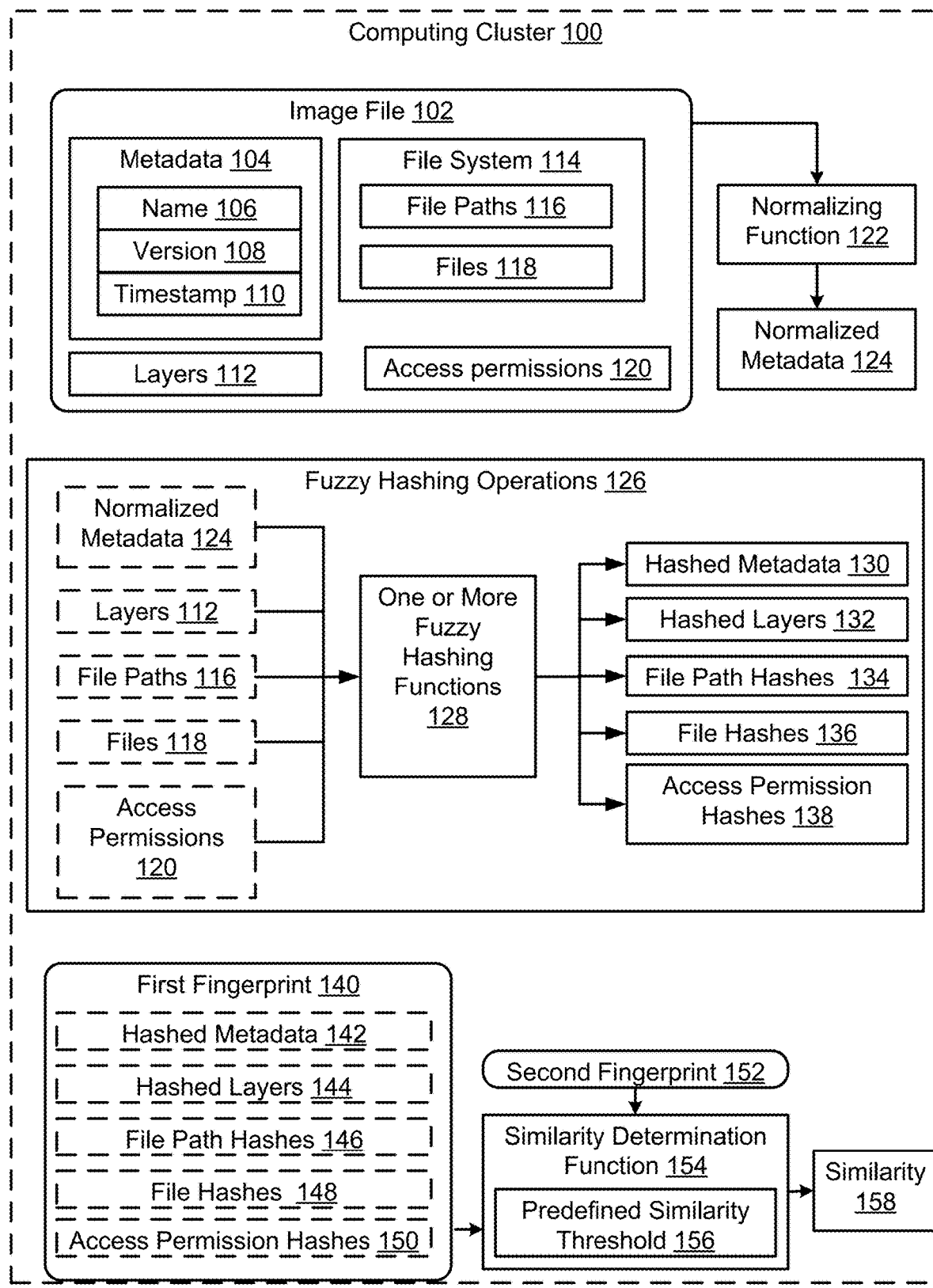
FIG. 1 is a block diagram of an example of a system for generating a first fingerprint and determining a similarity between the first fingerprint and a second fingerprint according to some aspects of the present disclosure.

Users may deploy software in a distributed computing environment using image files. In some situations, users may download the image files from software developers and directly deploy the corresponding software in their distributed computing environments, without making any modifications to the image files. But in other situations, users may wish to customize or modify the image files to fit the user's needs before deploying the corresponding software in the distributed computing environment. Modifications may include, for instance, adding layers to the image or customizing preexisting layers of the image. After making their desired modifications, the users may deploy the corresponding software from the image files in their computing environments.

In some cases, it may be desirable to track which software is running in a distributed computing environment by comparing hashes of the executing image files to hashes of known image files. For instance, cybersecurity and trend monitoring applications may benefit from tracking software running in a distributed computing environment. The process of comparing hashes of the executing image files to hashes of known image files can be referred to herein as fingerprinting, where a first fingerprint (e.g., hash) of an executing image file is compared to a second fingerprint of a known image file, to determine whether the executing image file is in fact the known image file or something else. But if the user has modified the image file prior to its execution, this process can become more difficult because the hash of the modified image file may be different from the hashes of the known image files. For example, if a user downloads an image file containing Red Hat Enterprise Linux and then modifies a portion of the image file prior to its execution, the hash of the modified image file will be different from the hash of the original image file that was downloaded. This is because traditional hashing techniques are sensitive to variations between the content of the image files. Thus, any modification to an image file by a user can prevent fingerprint matching of the modified image to the original image file or to similar image files in other computing environments. For purposes of determining whether image files are similar, but not necessarily identical, traditional fingerprint hashing techniques are inadequate due to the sensitivity of such hash functions.

Some examples of the present disclosure can overcome one or more of the abovementioned problems by using fuzzy hashing techniques to create fingerprints associated with image files, where the fingerprints are capable of tolerating a degree of variance between image files in order to identify similar image files. For example, a system can receive an image file used to deploy software in a distributed computing environment. The image file may contain metadata and layers. The metadata may be converted to normalized metadata before a fuzzy hashing function may be applied to the normalized metadata to generate hashed metadata. The layers may similarly be applied to the fuzzy function to generate hashed layers. The system may then generate a first fingerprint for the image file based on the hashed metadata and the hashed layers, for example by combining the hashed metadata and the hashed layers together. After generating the first fingerprint, the system may determine a similarity between the first fingerprint and a second fingerprint by comparing the first fingerprint to the second fingerprint within a similarity detection function. The second fingerprint can serve as a point of reference and may correspond to a known image file for known software. The second fingerprint may have been previously generated using similar techniques as the first fingerprint. If the system determines that the first fingerprint and the second fingerprint are sufficiently similar (e.g., their level of similarity exceeds a predefined threshold), then it can be implied that the image file is the same as the known image file, even if there are slight differences between their respective fingerprints due to user customizations. Based on determining that the first fingerprint is sufficiently similar to the second fingerprint, the system may determine that the known software is running in the distributed computing environment.

Using the techniques described above, the system may be able to better track (e.g., in real time) which software is currently running in the distributed computing environment. Normally this would be challenging in many circumstances, for example where the distributed computing environment hosts tens of thousands of users executing thousands of modified image files. In those circumstances, it may be hard to determine and track what software is actually running in the distributed computing environment at any given point in time, because the modifications to the image files hinder fingerprint comparisons. But by using the techniques described herein, even modified image files may be identified relatively quickly and easily, thereby improving the ability to monitor the software running in a distributed computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for generating a first fingerprint and determining a similarity between the first fingerprint and a second fingerprint according to some aspects of the present disclosure. The system includes a computing cluster 100 with an image file 102. The image file 102 may be received from external to the computing cluster 100 before being stored in the computing cluster 100. The image file 102 may include metadata 104 and a plurality of layers 112. Examples of the metadata 104 can include the name 106 of the image file, its authors, the version 108 of the image file, any timestamps 110 related to the image file 102 (e.g., when it was created, last edited, and/or last accessed), etc. The image file 102 may also include a file system 114 that includes, for instance, files 118 and file paths 116. The image file may also include access permissions 120, and any other data related to the image file 102. Access permissions 120 may control whether a user has read, write, or other permissions in relation to an individual file or a group of files (e.g., a folder or directory) within the image file.

The metadata 104 of the image file 102 can be passed to a normalizing function 122 to generate normalized metadata 124. The normalizing function 122 may be used to reduce differences between the metadata of various image files. The normalizing function 122 can perform tasks such as scaling, truncating, deleting null spaces, renaming, reformatting, or rearranging the metadata, among other tasks. Normalizing functions may similarly be applied to other data of the image file 102 such as the layers 112, the files 118, the file paths 116, or any combination of these, prior to applying the fuzzy hashing operations 126 discussed below.

One or more fuzzy hashing operations 126 may be applied to the content of the image file 102, such as the normalized metadata 124, layers 112, file paths 116, files 118, and/or access permissions 120. For instance, a first fuzzy hashing function may be applied to the normalized metadata 124 to generate hashed metadata 130, and a second fuzzy hashing function can be applied to the layers 112 to generate hashed layers 132. The first fuzzy hashing function may be the same as, or different from, the second fuzzy hashing function. Any number of fuzzy hashing schemes and algorithms can be applied to the content of the image file 102. Examples of such fuzzy hashing schemes can include Locality Sensitive Hashing (LSH), Context Triggered Piecewise Hashing (CPTH), or Similarity Preserving Hash Functions (SPHF). Examples of fuzzy hashing algorithms that may be applied may include ssdeep, sdhash, or Trend Micro Locality Sensitive Hash (TLSH).

Any combination of the original metadata 124, normalized metadata 124, layers 112, file paths 116, files 118, and access permissions may be hashed using the one or more fuzzy hashing functions 128. In one example, only the hashed metadata 130 and the hashed layers 132 are generated by applying the one or more fuzzy hashing functions 128 to the normalized metadata 124 and layers 112, respectively. As another example, only file path hashes 134 may be generated by applying one or more fuzzy hashing functions to the file paths 116. File hashes 136 and access permission hashes 138 may also be generated by applying one or more fuzzy hashing functions to the files 118 and access permissions 120, respectively.

A first fingerprint 140 may be generated based on one or more of the hashed data generated by the fuzzy hashing operations 126. For example, the first fingerprint 140 may be generated to include some or all of the hashed data described above. While the first fingerprint 140 is shown including hashed metadata 142, hashed layers 144, file path hashes 146, file hashes 148, and access permission hashes 138, in other examples the first fingerprint 140 may include more or fewer components. For instance, the first fingerprint 140 may include only file path hashes 146. The combination of data included in the first fingerprint 140 may be selected according to a variety of techniques, as will be described in greater detail later on.

In some examples, the first fingerprint 140 may be a vector in which the hashed data is arranged in a particular order. For example, the first fingerprint 140 may be a vector in which the first element is the hashed metadata 130, the second element is the hashed layers 132, the third element is the file path hashes 134, and so on. Other examples may involve a different arrangement of the data in the vector. If all of the fingerprints use the same order of elements, false negatives can be reduced.

In some examples, the first fingerprint 140 may be compared against a second fingerprint 152. The second fingerprint 152 may be similarly defined and arranged to the first fingerprint 140. For instance, each fingerprint may comprise a multi-dimensional vector including a variety of hashed data, such as the hashed metadata and hashed layers. The hashed data of the first fingerprint 140 and the second fingerprint 152 may be generated using the same fuzzy hashing functions and ordered in the same way, to improve the likelihood of similar image files being identified as such. The second fingerprint 152 may have been previously generated from a known image file, where the known image file may or may not have been previously deployed within the computing cluster 100.

The first fingerprint 140 and the second fingerprint 152 may be input into a similarity determination function 154 to determine a similarity 162 between the first fingerprint 140 and the second fingerprint 152. The similarity determination function 154 can calculate a similarity 158 (e.g., distance value) between the first fingerprint 140 and the second fingerprint 152. For instance, when each fingerprint comprises similarly ordered vector embeddings, optimization techniques such as k-means clustering or other machine learning techniques may be used to determine a similarity 158 (e.g., an error or distance value) between the first fingerprint 140 and the second fingerprint 152. While reference is made to comparing the first fingerprint 140 to the second fingerprint 152, any number of fingerprints may be compared to each other within the similarity detection function 158. For instance, the first fingerprint 140 may be compared against the second fingerprint 152, a third fingerprint, a fourth fingerprint, and so on. The similarity determination function 154 can output a respective similarity 162 for each comparison indicating how similar the two image files are to one another.

In some examples, the similarity determination function 154 determines a binary similarity 158 between the first fingerprint 140 and the second fingerprint 152, where the binary similarity 158 simply indicates that the first fingerprint 140 is the same as the second fingerprint 152, or that the first fingerprint 140 is not the same as the second fingerprint 152. The binary similarity 158 may be determined by calculating a distance between the first fingerprint 140 and the second fingerprint 152 and comparing the calculated distance with a predefined similarity threshold 164. The predefined similarity threshold 164 may be defined by a user and may represent an acceptable boundary of uncertainty in categorizing and classifying image files. Distances meeting or exceeding the predefined similarity threshold 164 may lead to the first fingerprint 140 being marked as similar to the second fingerprint 152.

The predefined similarity threshold 164 may be set to different values based on the second fingerprint 150. For instance, if the second fingerprint 150 corresponds to a known image file that is suspected of deploying malware, the predefined similarity threshold 164 assigned to the second fingerprint 152 may be lower to account for this risk. In other words, the user may wish to be extra cautious with respect to any image files resembling the known image file and assign a lower similarity threshold 164 to the second fingerprint 152 accordingly. This may flag more image files as being similar to the known image file, at which point the user may conduct a manual evaluation of those image files to determine how to proceed. To implement these features, in some examples the system can include a mapping of similarity thresholds to fingerprints, where the similarity thresholds may be different from one another and customized by the user based on the characteristics of the image files corresponding to the fingerprints.

In some examples, the similarity determination function 154 can calculate a similarity 158 between the first fingerprint 140 and the second fingerprint 152, where the similarity 158 is a non-binary numerical score, such as a vector distance value. The similarity 158 may serve as a normalized score within a predefined non-binary numerical range indicating how similar the first fingerprint 140 is to a second fingerprint 152. If the similarity 158 between the first fingerprint 140 and the second fingerprint 152 does not meet or exceed the predefined similarity threshold 164, in some examples the similarity determination function 154 can continue to compare the first fingerprint 140 against additional reference fingerprints until a reference fingerprint is identified that meets or exceeds the predefined similarity threshold 156. Additionally, or alternatively, the similarity determination function can rank each of the reference fingerprints based on their similarity to the first fingerprint 140. From this ranking, the system can determine which of the reference fingerprints is most similar to the first fingerprint 140, which may be useful information even if that reference fingerprint does not meet or exceed the similarity threshold 156.

The similarity 158 may be stored as information within the computing cluster for display to a user. The similarity 158 may indicate to a user a risk factor with deploying an image. A lower similarity may indicate to a user that the image file is unknown and should take additional precautions to mitigate risk. Thus, if the similarity 158 is below the predefined similarity threshold 156, the system may output a warning indicating the risk to the user. The warning may include the similarity 158 and identify the risks associated with deploying the associated image file.

Figure 2:
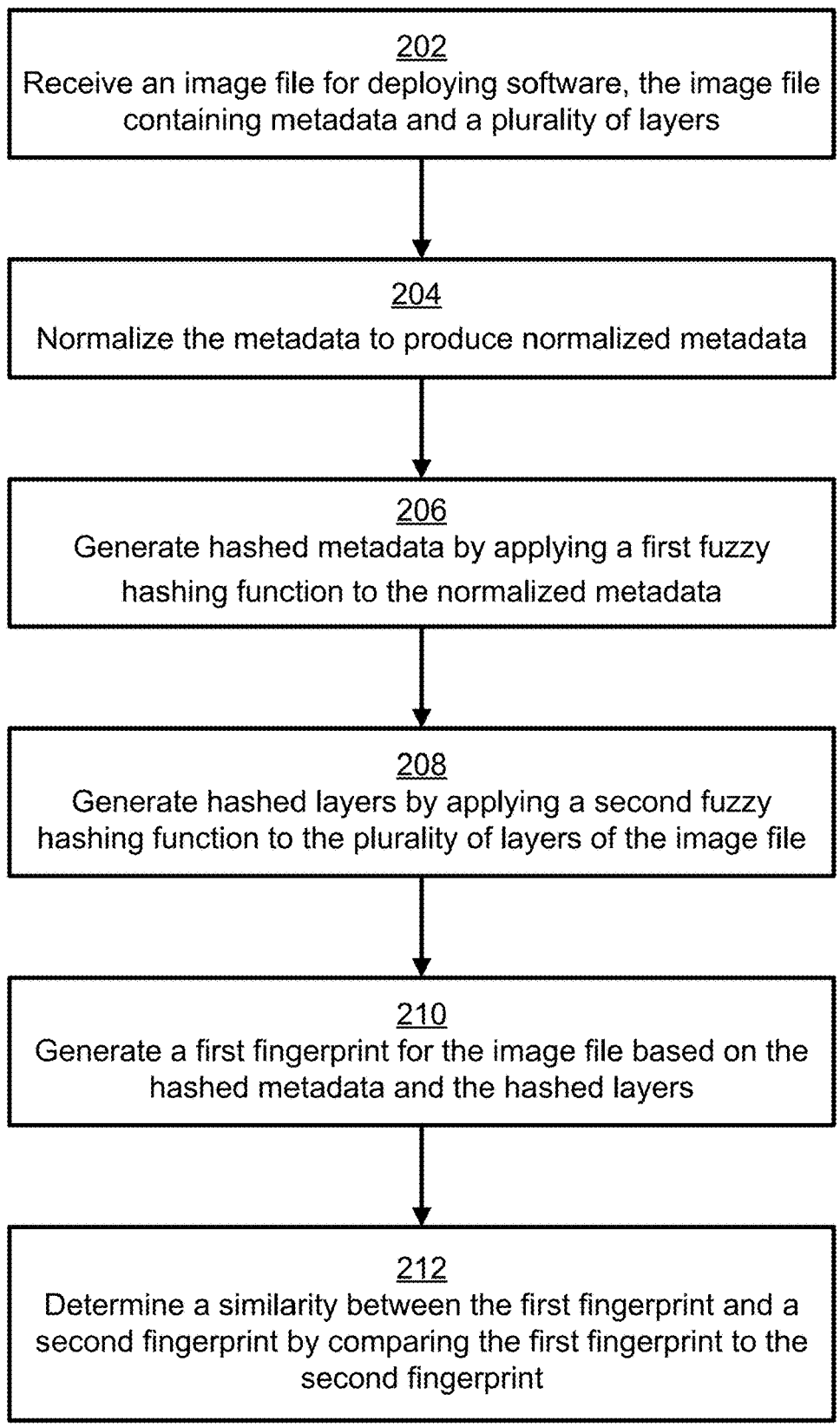
FIG. 2 is a flowchart of an example of a process for generating a first fingerprint and determining a similarity between the first fingerprint and a second fingerprint according to some aspects of the present disclosure.

Turning now to FIG. 2, FIG. 2 shows a flowchart of an example of a process for generating a first fingerprint and determining a similarity between the first fingerprint and a second fingerprint according to some aspects of the present disclosure. Other examples may include more operations, fewer operations, different operations, or a different order of the operations shown in FIG. 2. The operations of FIG. 2 will now be described with respect to the components of FIG. 1.

In block 202, a processor receives an image file 102 for deploying software within the computing cluster 100. The image file 102 can contain metadata 104 and a plurality of layers 112. The image file 102 may originate from within the computing cluster 100 or may come from external the computing cluster 100. The image file 102 can include any type of image file for deployment of software within a distributed computing environment or computing cluster 100. In some examples, the image file 102 may be used to deploy software inside of containers (e.g., Docker containers) or virtual machines. The image file 102 also be used to deploy software in a variety of distributed computing environments, such as Kubernetes environments. The metadata 104 may include a variety of data describing the image file 102 such as the name 106 of the image file or its authors. The version 108 and version history of the image file 102 may also be stored as metadata 104. Similarly, metadata 104 may include one or more timestamps 110 corresponding to edits or other important events associated with the image file 102.

In block 204, the processor normalizes the metadata 104 to produce normalized metadata 124. Metadata 104 normalization may include any processes used to reduce false positives or false negatives due variations within the metadata 104. Normalizing can include reformatting the metadata, removing extraneous information from the metadata, etc. For instance, erroneous values in the timestamps 110 such as negative values may be deleted to generate the normalized metadata 124. Normalization may also include reorganizing the metadata into a specific, ordered sequence of values.

In block 206, the processor generates hashed metadata 130 by applying a first fuzzy hashing function to the normalized metadata 124. The first fuzzy hashing function may be included within the one or more fuzzy hashing functions 128. Examples of the structure underlying the one or more fuzzy hashing functions 128 may include Locality Sensitive Hashing (LSH), Context Triggered Piecewise Hashing (CPTH), or Similarity Preserving Hash Functions (SPHF). Examples of fuzzy hashing functions may include TLSH.

In block 208, the processor generates hashed layers 132 by applying a second fuzzy hashing function to the plurality of layers 112 of the image file 102. The second fuzzy hashing function can be the same fuzzy hashing function as the first fuzzy hashing function. Alternatively, the second fuzzy hashing function can be different from the first fuzzy hashing function. For instance, different fuzzy hashing functions may be applied to text values such as metadata 104 compared to layers 112.

In block 210, the processor generates a first fingerprint 140 for the image file based on the hashed metadata and the hashed layers. For example, the processor can generate the first fingerprint 140 by combining the hashed metadata and the hashed layers into a vector or array. In other examples, the first fingerprint 140 may include any combination of hashed data generated by the one or more fuzzy hashing functions 128.

In block 212, the processor determines a similarity 162 between the first fingerprint 140 and a second fingerprint 152 by comparing the first fingerprint to the second fingerprint. The processor may determine any type of similarity 162 between the first fingerprint 140 and the second fingerprint 152 according to techniques described herein, such as edit distance techniques. In response to determining that the similarity between the first fingerprint and the second fingerprint exceeds the predefined similarity threshold 156, the processor may execute one or more operations. For example, the processor may store information in a database indicating that the software to be deployed by the image file 102 is running in the computing cluster 100.

Figure 3:
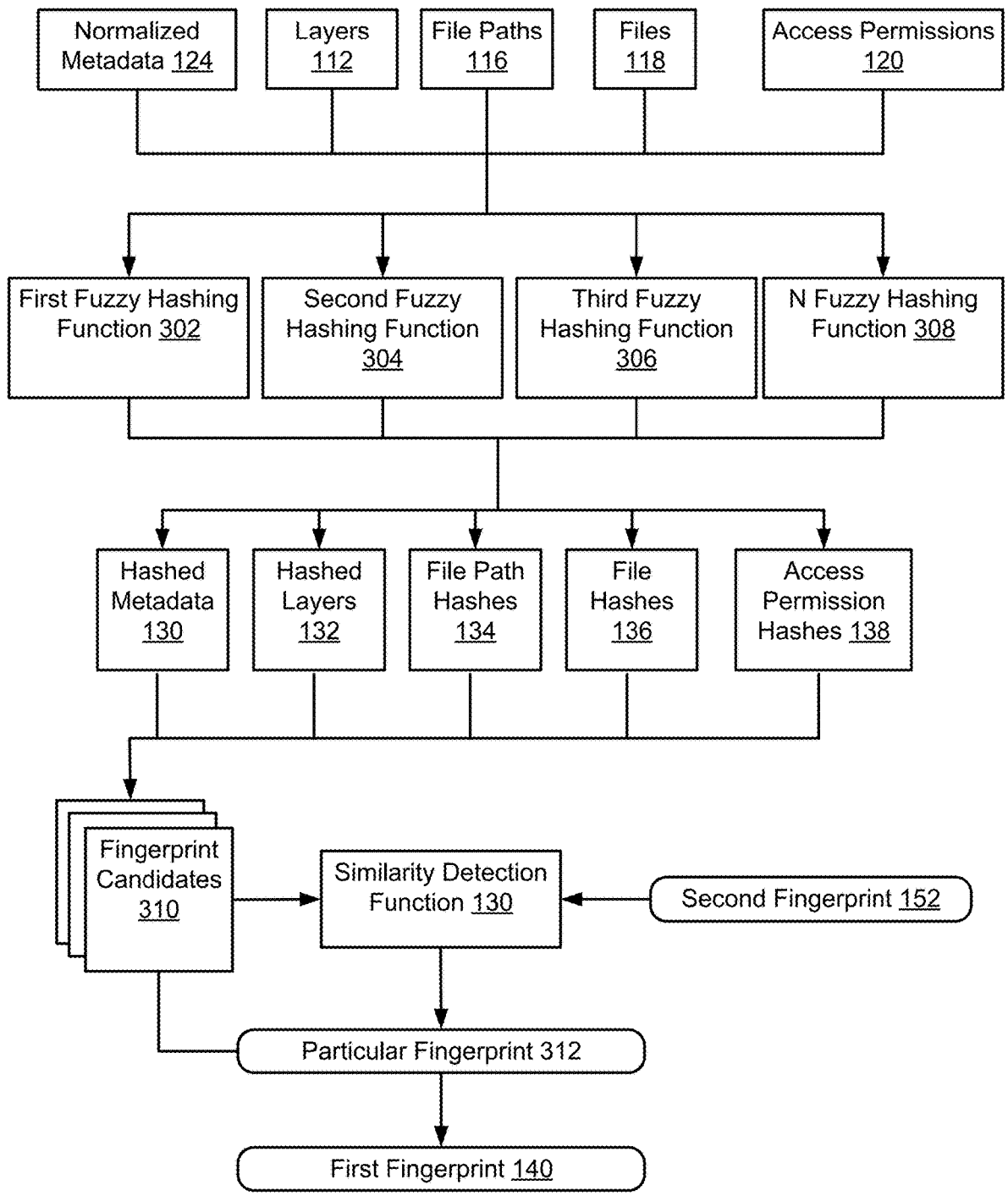
FIG. 3 is a block diagram of an example of a system for generating and adjusting a first fingerprint according to some aspects of the present disclosure.

FIG. 3 is a block diagram of an example of a system for generating and adjusting a first fingerprint according to some aspects of the present disclosure. Some of the components described with respect to FIG. 3 may be similar to those described with respect to FIG. 1.

In general, any number and combination of content from an image file can be hashed using any number and combination of fuzzy hashing functions, and then arranged in any number and combination of ways, to produce multiple fingerprint candidates 310 for the image file. Each of the fingerprint candidates 310 can then be compared to a reference fingerprint (e.g., second fingerprint 152) of a known image file, using a similarity determination function 154, to determine which of the fingerprint candidates 310 is most similar to the reference fingerprint. If the image file is the same as the known image file, this process can be used to test which fingerprint generation technique yields the best result. In other words, by iteratively creating fingerprint candidates of a known image file using different techniques, and then comparing the fingerprint candidates to a reference fingerprint of the known image file, the system can determine which technique produces the best results. That technique can then be subsequently used to generate fingerprints for modified image files deployed in the computing cluster. This iterative testing approach can account for the fact that the "best" fingerprinting technique may change depending on the circumstances (e.g., the type, content, and size of the image file) and, thus, different fingerprinting techniques may be better suited to different situations.

More specifically, the system can include one or more fuzzy hashing functions 128. In this example, the fuzzy hashing functions include a first fuzzy hashing function 302, a second fuzzy hashing function 304, a third fuzzy hashing function 306, and an Nth fuzzy hashing function 308. More or fewer fuzzy hashing functions may be applied to inputs 112, 116, 118-120, and 124. A of the described fuzzy hashing functions may be applied to each input. For instance, the first fuzzy hashing function 302 may be applied to normalized metadata 124 and/or the layers 112. Each of the inputs are optional inputs for generating fingerprint candidates 310. Thus, not every input may be used to generate every fingerprint candidate 310. The hashing functions 302-308 may be the same fuzzy hashing functions as one another or different fuzzy hashing functions to one another.

Applying the fuzzed hashing functions to the inputs can yield hashed data pertaining to the image file, such as hashed metadata 130 from the normalized metadata 124. The hashed data is used to generate fingerprint candidates 310. Each of the fingerprint candidates 310 represents a combination of one or more pieces of the hashed data 130-138. For instance, a first fingerprint candidate can comprise only file path hashes 134. A second fingerprint candidate can comprise file path hashes 134 as well as file hashes 136. A third fingerprint candidate can include all of the hashed image data 130-138, with each piece of hashed image data 130-138 being generated using the same or different fuzzy hashing functions.

Fingerprint candidates 310 may be iteratively generated. For instance, hundreds or thousands of fingerprint candidates 310 may be generated by applying various combinations of fuzzy hashing functions to various combinations of image data. Similarly, weights and biases may be applied to the hashed image data 130-138. For instance, greater weight may be applied to hashed metadata 130 as compared to file path hashes 134 when forming a fingerprint candidate.

Each of the fingerprint candidates 310 may be applied through a similarity determination function 154 to compare the fingerprint candidate 310 with the second fingerprint 152. The second fingerprint 152 may be a labeled fingerprint, associated with a known image file and associated software. The second fingerprint 152 may also be part of a dataset of labeled fingerprints used to tune and train the generation of fingerprint candidates 310 by the processor.

The similarity determination function 154, having received the fingerprint candidates 310 and having compared them with a second fingerprint 152, may select a particular fingerprint 312 from the fingerprint candidates 310 to be the first fingerprint 140. Selecting the particular fingerprint 312 to be the first fingerprint 140 can be based on one or more factors. In one example, the similarity determination function 154 selects fingerprint candidate 310 with the highest similarity to the second fingerprint 152. In another example, the similarity determination function 154 selects the fingerprint candidate 310 that has the mean similarity from the collection of all fingerprints candidates 310 processed by the similarity determination function 154.

In the examples of FIGS. 1 and 3, the first fingerprint 140 may be generated by iteratively combining different amounts and types of hashed content associated with the image file 102, thereby producing the one or more fingerprint candidates 310. The processor may determine that a particular fingerprint 312 candidate, from among the one or more fingerprint candidates 310, is most similar to the second fingerprint 152 as compared to a remainder of the plurality of fingerprint candidates 310. The processor may then select the particular fingerprint 312 candidate for use as the first fingerprint 140.

The process of iteratively combining different amounts and types of hashed content to produce one or more fingerprint candidates, and the process of selecting a particular fingerprint 312 candidate for use as the first fingerprint may be performed according to a variety of techniques. For instance, nested for loops may be used to generate and test the fingerprint candidates 310. Similarly, machine learning techniques of training a machine learning model to generate fingerprint candidates 310 based on a training set of fingerprint candidates may be used.

Figure 4:
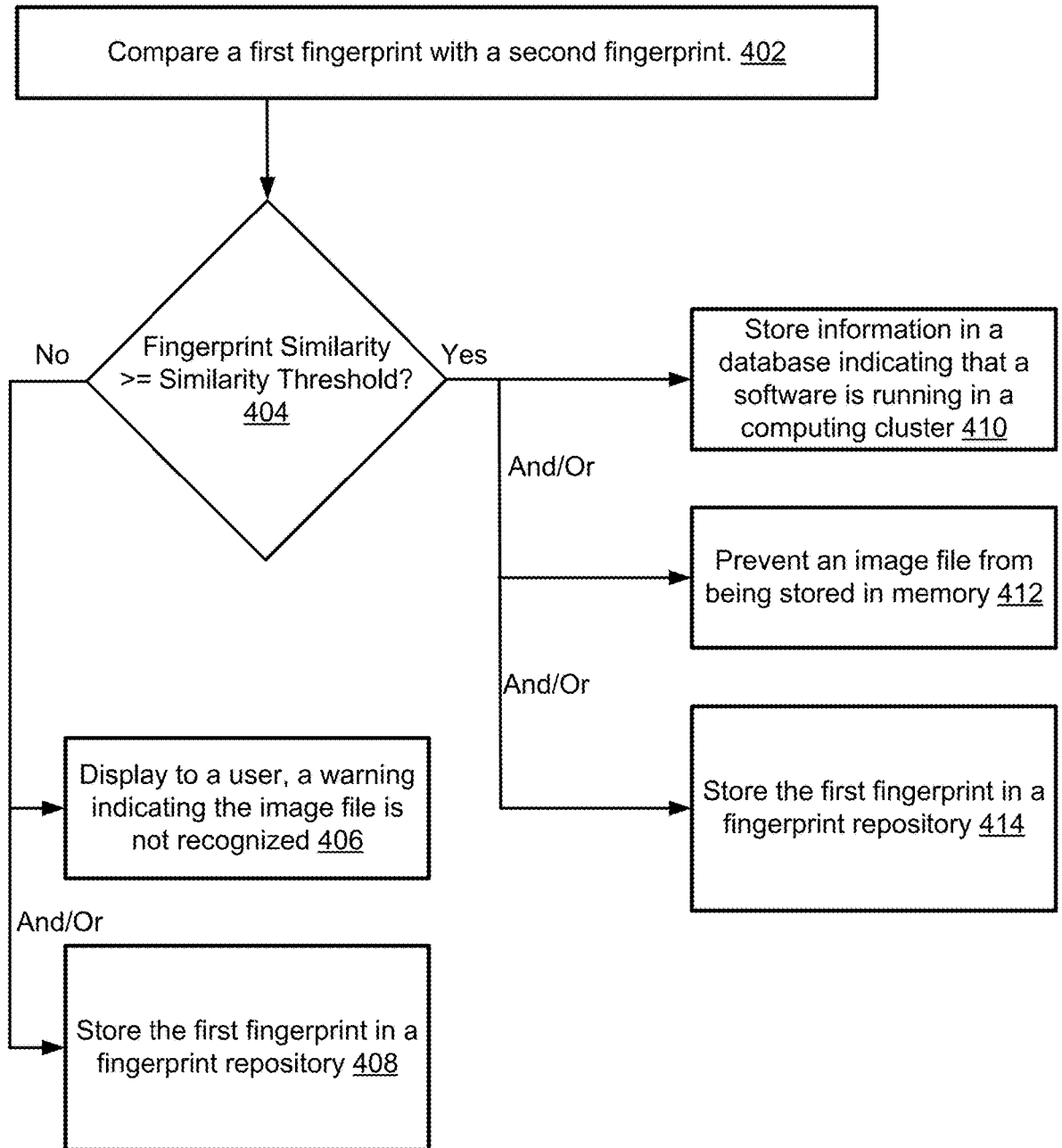
FIG. 4 is a flowchart of an example of a process for determining an action based on a fingerprint comparison according to some aspects of the present disclosure.

Turning now to FIG. 4, shown is a flowchart of an example of a process for determining an action based on a fingerprint comparison according to some aspects of the present disclosure. Other examples may include more operations, fewer operations, different operations, or a different order of the operations shown in FIG. 4. The operations of FIG. 4 will now be described with respect to the components of FIG. 1.

In block 402, the processor compares a first fingerprint 140 with a second fingerprint 152. The comparison may apply similar techniques to the similarity determination function 154 described with respect to FIG. 1. For instance, the processor may apply optimization and/or machine learning techniques to calculate an error or distance between the first fingerprint and the second fingerprint. The comparison at block 402 may for instance output a similarity 158 (e.g., similarity score) indicating the degree to which the first fingerprint is similar to the second fingerprint. In some examples, the similarity may take the form of a decimal value or a percentage, e.g., the first fingerprint is 90% similar to the second fingerprint per the similarity determination function 154 operations.

In block 404, the processor compares the fingerprint similarity 158 to a predefined similarity threshold 156. If the fingerprint similarity 158 is below the predefined similarity threshold 158, the processor may perform operations such as operations at blocks 406 or 408. Alternatively, if the fingerprint similarity 158 meets or exceeds the predefined similarity threshold 158, the processor may perform any combination of operations at blocks 408-414.

At block 406, in response to the processor determining that the fingerprint similarity is below the predefined similarity threshold 158, the processor may display, to a user, a warning indicating the image file is not recognized. The warning may be displayed on any client device available to a user. In some examples, the user can be a developer user adding the image file to the computing cluster 100. In other examples, the user can be a system administrator responsible for managing the computing cluster 100. The warning may be configurable by the user, or alternatively be defined by computing cluster 100 system security.

At block 408, in response to the processor determining that the fingerprint similarity is below the predefined similarity threshold 158, the processor may store the first fingerprint 140 in a fingerprint repository. Prior to storing the first fingerprint 140 in the fingerprint repository, the processor may prompt a user, through a client device, requesting permission to store the first fingerprint. The user may reject the prompt and prevent the first fingerprint from storage within the fingerprint repository or within the computing cluster 100 more generally.

At block 410, in response to the processor determining that the fingerprint similarity meets or exceeds the predefined similarity threshold 158, the processor may be configured to store information in a database indicating that software corresponding to the first fingerprint 140 is running in a computing cluster. The software may be deployed in the computing cluster 100 from the image file 102 associated with the first fingerprint.

The image file 102 may be used to generate a fingerprint through operations described with respect to FIG. 1. Then, when the fingerprint is compared to a second fingerprint 152, the second fingerprint 152 may similarly be based in part on an image file with associated software for deployment. By comparing the first fingerprint 140 with the second fingerprint 152 and determining that the two fingerprints are sufficiently similar, the processor can identify that the software deployed by the first image, and running within the computing cluster 100, is sufficiently similar to known software associated with the second fingerprint. The processor may then store the information in a database to indicate that a software is running in the computing cluster. This process may be iterated for dozens or hundreds of image files executing in the computing cluster 100 to help an administrator or other user to track which software is running in the computing cluster.

At block 412, in response to the processor determining that the fingerprint similarity meets or exceeds the predefined similarity threshold 158, the processor may be configured to prevent the image file associated with the first fingerprint from being stored in memory within the computing cluster. For instance, the second fingerprint 152 which the first fingerprint 140 is compared against may be known to be associated with a vulnerability, e.g. a virus or other malware. Additionally, or alternatively, the second fingerprint may be known to be associated with a software that is resource intensive and predicted to impair operations within computing cluster 100. In any of these examples, a user may wish to prevent an image file 102 from deploying a specific type of software. The processor, by detecting a similarity 158 between fingerprints, may identify similarities between software associated with the fingerprints, and thereby prevent such software from deploying from the associated image file.

At block 414, in response to the processor determining that the fingerprint similarity meets or exceeds the predefined similarity threshold 158, the processor may store the first fingerprint 140 in a fingerprint repository. Storing the first fingerprint in the fingerprint repository may provide for additional tracking of fingerprints and associated software deployed in the computing cluster. For instance, the fingerprint repository may increment a counter indicating the number of instances of the fingerprint being stored in the repository. Then, a user per a request may be able to view the counter or other display through a client device. The display may provide an overview of trends of various fingerprints as stored in the fingerprint repository.

Figure 5:
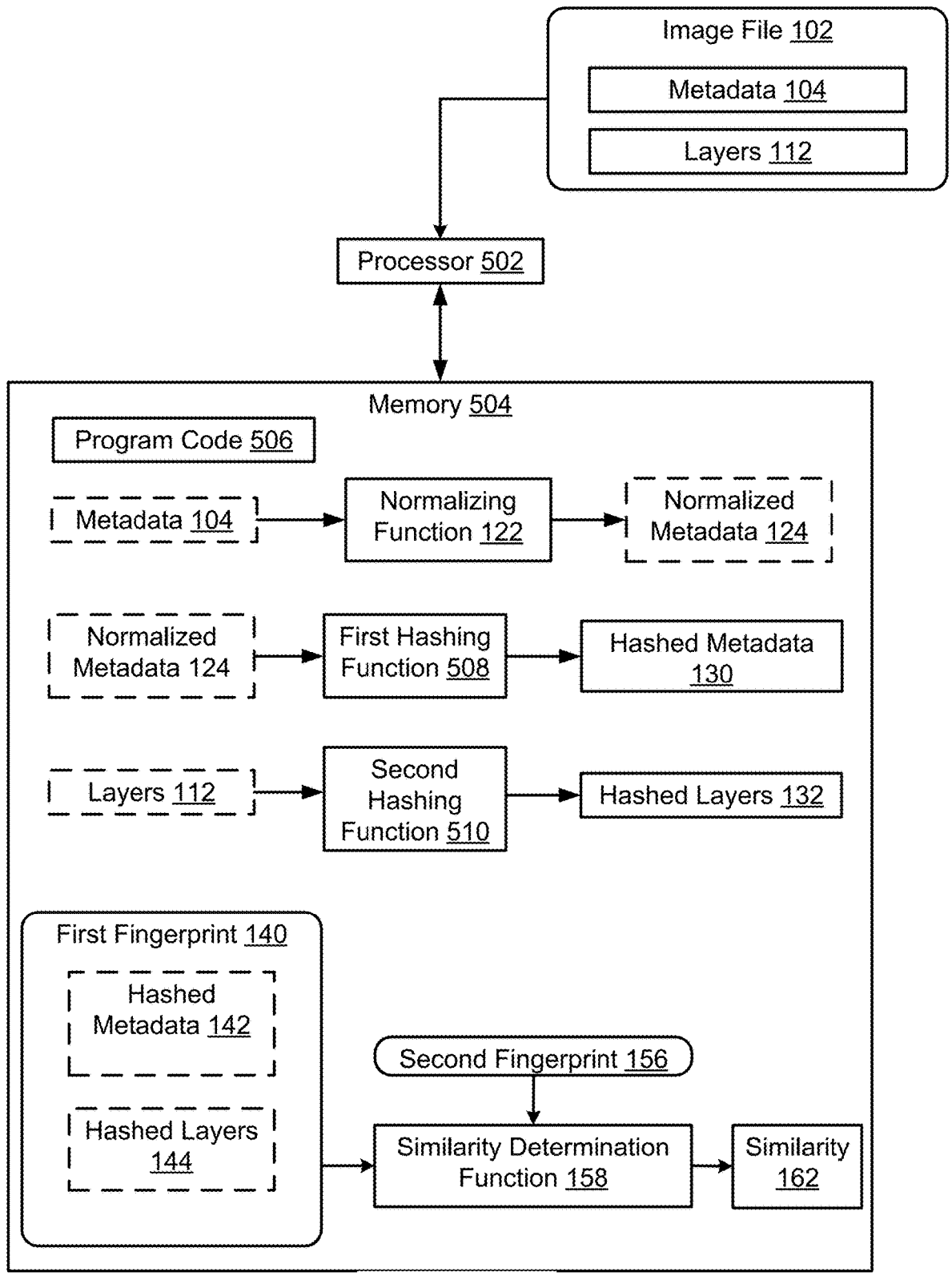
FIG. 5 is a block diagram of an example of a system for generating a first fingerprint and determining a similarity between the first fingerprint and a second fingerprint according to some aspects of the present disclosure.

Referring now to FIG. 5, FIG. 5 is a block diagram of an example of a system for generating a first fingerprint and determining a similarity between the first fingerprint and a second fingerprint according to some aspects of the present disclosure. The system includes a processor 502 communicatively coupled to a memory 504 for implementing aspects of the disclosure. Also shown is an image file 102 including metadata 104 and layers 112. The image file 102 may be received by the processor 502 from any suitable source.

The processor 502 can include one processor or multiple processors. Non-limiting examples of the processor 502 include a Field-Programmable Gate Array (FPGA), an application-specific integrated circuit (ASIC), a microprocessor, or a combination thereof. The processor 502 can execute computer-readable program code 506 stored in the memory 504 to perform operations. In some examples, the computer-readable program code 506 can include processor-specific instructions generated by a compiler or an interpreter from code written in any suitable computer-programming language, such as C, C++, C#, and Java.

The memory 504 can include one memory or multiple memories. Memory 504 can be volatile or non-volatile (e.g., any type of memory device that retains stored information when powered off). Non-limiting examples of memory 504 include electrically erasable and programmable read-only memory (EEPROM), flash memory, or any other type of non-volatile memory. At least some of the memory 504 includes a non-transitory computer-readable medium from which the processor 502 can read computer-readable program code 506. A computer-readable medium can include electronic, optical, magnetic, or other storage devices capable of providing the one or more processors 502 with computer-readable program code 506. Examples of a computer-readable medium can include magnetic disks, memory chips, ROM, random-access memory RAM, an ASIC, a configured processor, optical storage, or any other medium from which a computer processor can read program code 506.

In some examples, the processor 502 can execute the computer-readable program code 506 to perform any of the operation described herein. For example, the processor 502 can receive the image file 102 and extract its metadata. The processor 502 can execute functions such as the normalizing function 122 to normalize the metadata 104 to generate normalized metadata 124. The processor can generate hashed metadata 130 by applying a first hashing function 508 to the normalized metadata 124, and the processor 502 can generate hashed layers 132 by applying a second hashing function 510 to the layers 112. The first hashing function 508 may be the same as, or different from, the second hashing function 510. The processor 502 may then generate a first fingerprint 140 based on the hashed metadata 142 and hashed layers 144. In some examples, the first fingerprint 140 may include additional hashed information in the fingerprint, as described above. A second fingerprint 152 may be generated by the processor 502 per similar techniques. The processor can then compare the first fingerprint 140 to the second fingerprint 152 to determine a similarity 162 between the two. If they are sufficiently similar, it may mean that the first fingerprint 140 is a modified version of the second fingerprint 152. The processor 502 can use this information for a variety of purposes, such as to track which software is running in a computing cluster containing the image file 102.

Figure 6:
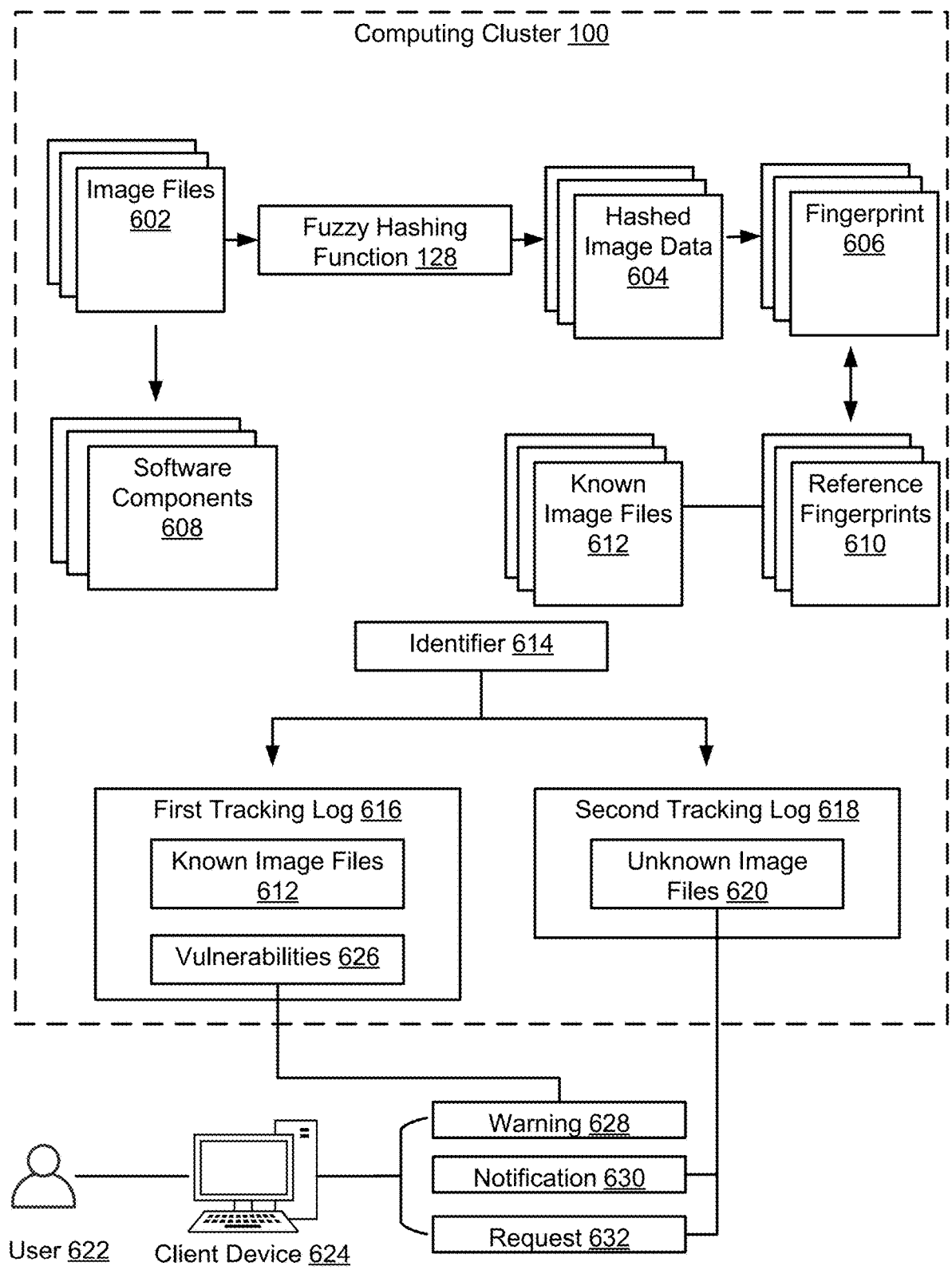
FIG. 6 is a block diagram of an example of a system for monitoring which software is deployed in a computing cluster using fingerprints according to some aspects of the present disclosure.

FIG. 6 is a block diagram of an example of a system for monitoring which software is deployed in a computing cluster according to some aspects of the present disclosure. Some of the components of the block diagram may be similar to those discussed with respect to other figures. For instance, image files 602 may comprise one or more image files similar to image file 102 described with respect to FIG. 1.

The image files 602 can be used to deploy software components 608 in the computing cluster 100. The computing cluster 100 may obtain (e.g., receive) the image files 602 from any suitable source, which may be external to the computing cluster 100. In some examples, the user 622 may upload one or more of the image files 602 to the computing cluster 100 through a client device 624.

The content of the image files 602 may be extracted from the image files 602 and passed through one or more fuzzy hashing functions 128 to generate hashed image data 604, e.g. hashed metadata 130 or hashed layers 132, according to similar techniques described herein. The hashed image data 604 of each image files 602 may be used to generate an associated fingerprint 606. The fingerprints 606 may be compared against reference fingerprints 610 to further identify the software components 608 associated with each of the image files 602.

For instance, reference fingerprints may be generated from known image files 612 according to similar techniques used to generate fingerprints 606. The known image files 612 may be labeled or otherwise known to deploy specific software components and configurations. The software components associated with the known image files 612 may be identified during the fingerprint generation process so that reference fingerprints 610 may be associated with specific software components. The processor may then compare the fingerprints 606 generated from image files 602 to the reference fingerprints 610. Comparing the fingerprints 606 with the reference fingerprints 610 may lead to determining similarities and differences between the associated image files 602 and known image files 612. If a similarity between a fingerprint 606 and a reference fingerprint 610 exceeds a predefined similarity threshold, for instance, the fingerprint 606 may be identified as similar to, or the same as, the reference fingerprint 610.

Tracking logs may be used to record and track which image files, and therefore associated software components, are deployed within a computing cluster 100. A first tracking log 616 may store an identifier 614 of an image file 602 if the image file is determined to be a known image file. Each fingerprint 606 may be compared against a catalog of reference fingerprints 610 until a sufficiently similar reference fingerprint is found. An identifier of the image file may be stored in the first tracking log 616, where the identifier identifies the reference fingerprint found to be sufficiently similar to the fingerprint.

If the processor exhausts each of the reference fingerprints 610 and no sufficiently similar reference fingerprint 610 is identified, the image file associated with the fingerprint may be identified or designated as belonging to an unknown image file 620. The second tracking log 618 may store identifiers 614 that identify image files as 602 unknown or unrecognized. In some examples, the unknown image file 620 may be deployed within the computing cluster 100, for instance, with permission of the user 622. Performance metrics of the software deployed by the unknown image file 620 may be recorded and stored as metadata associated with the unknown image file 620 and stored in the second tracking log 618.

The tracking logs may be used to provide information to a user 622 through a client device 624. The client device 624 may for instance be a personal computer interface that the user is using to deploy or monitor image files within a computing cluster 100. Among other interfaces, warnings 628, notifications 630, and requests 632 may be issued to the user 622 regarding information stored in the tracking logs. For instance, in response to determining that the image file is an unknown image file, the client device 624 may notify a user 622 that the image file is an unknown image file. The notification may further include a request 632 for the user 622 to label or identify the image file.

In another example, in response to determining that the image file is a known image file, the client device 624 may take similar or different actions. For instance, the processor may identify an image file as the same or similar to a known image file 612, where the image file is associated with vulnerability such as a virus or other malware. As another example, the processor may identify the image file as requiring significant computing resources that may otherwise impact a node or the overarching computing cluster 100. In response, the client device 624 may output a warning 628 to the user 622 indicating that the image file is associated with a virus or high resource usage. In some such examples, the processor 502 may automatically remove the image file from the computing cluster 100 prior to deployment of the image file. The client device may instead output a notification 630 to the user indicating that an image file was detected with expected similarities to malware and that the image file has since been removed from the computing cluster.

In further examples, the client device 624 may provide a topology overview of the computing cluster 100 and metrics related to the tracking logs operating with the computing cluster 100. For instance, the first tracking log 616 can record the quantity and type of each image running within the computing cluster 100. The computing cluster may be identified to be running several instances of the same known image files 612. The rate of usage of known image files 612 may also be tracked and displayed through the client device 624. Trends in image usage may therefore be detected and recorded within the computing cluster. Similarly, the quantity of unknown image files being deployed within the computing cluster may be tracked and displayed through the client device 624 to the user 622. By enabling a processor to detect similarities between image files operating within a computing cluster, modifications to image files may be tracked and insights into user's usage of the computing cluster may be identified.

In some examples, the techniques described herein may be applied to an image registry. For instance, the techniques described herein can be applied when a user attempts to storage an image file in the registry, by comparing a fingerprint of the image file to fingerprints of existing image files that are already stored in the registry. This may help prevent against storing substantially the same image file multiple times, which would unnecessarily consume memory. The techniques described herein may also be applied as part of a continuous integration/continuous deployment (CI/CD) pipeline, for example to help with version control.

Figure 7:
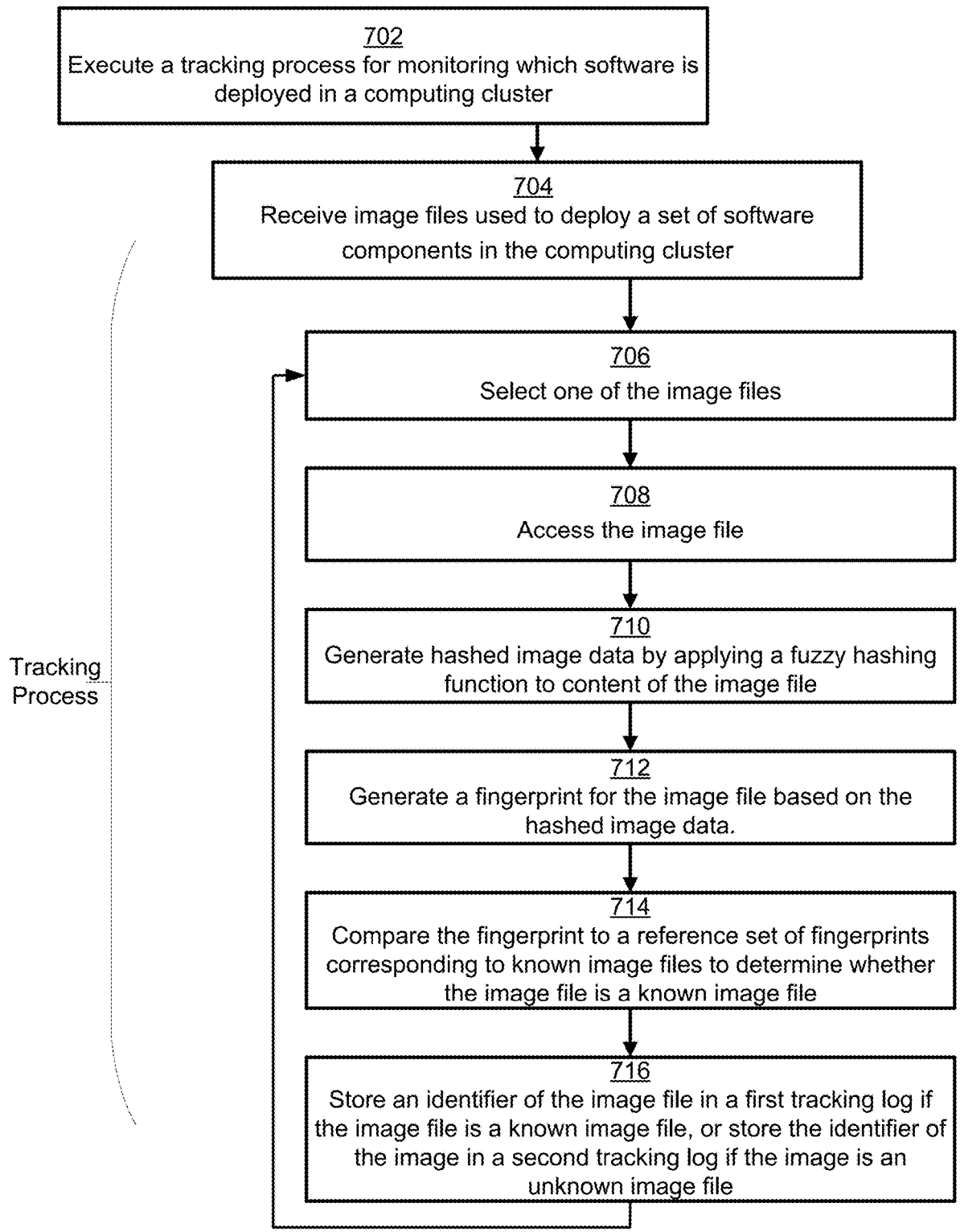
FIG. 7 is a flow chart of an example of a process for monitoring which software is deployed in a computing cluster according to some aspects of the present disclosure.

Turning now to FIG. 7, shown is a flowchart of an example of a process for monitoring which software is deployed in a computing cluster according to some aspects of the present disclosure. Other examples may include more operations, fewer operations, different operations, or a different order of the operations shown in FIG. 7. The operations of FIG. 7 will now be described with respect to the components of FIG. 6.

At block 702, a processor executes a tracking process for monitoring which software is deployed in a computing cluster. The tracking process may be an executable or background process configured to run at a designated location within the computing cluster 100. The tracking process may be distributed across nodes within the computing cluster.

Blocks 704-716 are operations performed by the tracking process executed by the processor. At block 704, the processor receives image files used to deploy a set of software components in the computing cluster. The image files may be received from a variety of users operating within the computing cluster 100. For instance, hundreds of users may upload image files across the computing cluster, which are then received by the processor.

Blocks 706-716 are operations performed by the tracking process and for each image file received at block 704. Blocks 706-716 may be iteratively performed until some or all of the image files have been processed according to blocks 706-716. At block 706, the tracking process selects one of the received image files to evaluate. The tracking process may select the image file per any number of rules. For instance, the image file may be selected based on a First in First Out ("FIFO") or Last in First Out ("LIFO") process. The image file may be selected per other rules, such as the size of the image file. At block 708, the tracking process accesses the image file.

At block 710, the tracking process generates hashed image data by applying one or more fuzzy hashing functions to content of the image file. Content of image file may be any of the content discussed above with respect to FIG. 1, such as metadata 104, file paths 116 and files 118 from a file system 114, layers, and/or access permissions 120.

At block 712, the tracking process generates a fingerprint 606 for the image file 602 based on the hashed image data 604. Any combination or weighted combination of hashed image data may be used to generate the fingerprint. Each fingerprint generated may be structured as a vector with a specific ordered set of embeddings, wherein each embedding within the vector includes one of the hashed image data values.

At block 714, the tracking process compares the fingerprint 606 to a set of reference fingerprints 610 corresponding to known image files 612 to determine whether the image file 602 is similar to or the same as a known image file 612. Comparing the reference set of fingerprints may include calculating distances between each of the set of fingerprints to fingerprints of known image files. If, for instance, the calculated distances do not exceed a threshold, a fingerprint may be identified as similar or identical to a known image file 612.

At block 716, the tracking process stores an identifier 614 of the image file 602 in a first tracking log 616 if the image file 602 is a known image file 612, or stores the identifier 614 of the image file 602 in a second tracking log 618 if the image file is an unknown image file 620. Additional metadata regarding the image files may be stored in the first tracking log 616, second tracking log 618, or other tracking log. For instance, the degree of similarity between the image files may be stored in a tracking log for display in a client device. After the tracking process performs operations at block 716, the tracking process may return to block 706 where the tracking process selects another one of the image files. The process may be repeated until each of the image files received at block 704 have been processed. Block 704 may also be continuously performed during the operations of blocks 706-716, such that additional image files are received while the tracking process processes individual image files as discussed with respect to blocks 706-716.

Some aspects of the present disclosure may be performed according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to perform operations including: receiving an image file for deploying software, the image file containing metadata and a plurality of layers; normalizing the metadata to produce normalized metadata; generating hashed metadata by applying a first fuzzy hashing function to the normalized metadata; generating hashed layers by applying a second fuzzy hashing function to the plurality of layers of the image file; generating a first fingerprint for the image file based on the hashed metadata and the hashed layers; and determining a similarity between the first fingerprint and a second fingerprint by comparing the first fingerprint to the second fingerprint.

Example #2: The non-transitory computer-readable medium of Example #1, wherein the second fingerprint is associated with the image file, and wherein the operations further comprise: in response to determining that the similarity between the first fingerprint and the second fingerprint meets or exceeds a predefined similarity threshold, storing information in a database indicating that the software is running in a computing cluster.

Example #3: The non-transitory computer-readable medium of any of Examples #1-2, wherein the second fingerprint is associated with the image file, and wherein the operations further comprise: in response to determining that the similarity between the first fingerprint and the second fingerprint is below a predefined similarity threshold, displaying, to a user, a warning indicating the image file is not recognized.

Example #4: The non-transitory computer-readable medium of any of Examples #1-3, wherein the metadata includes a name, a version, and a timestamp associated with the image file.

Example #5: The non-transitory computer-readable medium of any of Examples #1-4, wherein the operations further comprise: generating file path hashes by applying a third fuzzy hashing function to file paths associated with a filesystem of the image file; and generating the first fingerprint based on the file path hashes.

Example #6: The non-transitory computer-readable medium of any of Examples #1-5, wherein the operations further comprise: generating file hashes by applying a third fuzzy hashing function to individual files in a filesystem of the image file; and generating the first fingerprint based on the file hashes.

Example #7: The non-transitory computer-readable medium of any of Examples #1-6, wherein the first fuzzy hashing function is the same as the second fuzzy hashing function.

Example #8: The non-transitory computer-readable medium of any of Examples #1-6, wherein the first fuzzy hashing function is different from the second fuzzy hashing function.

Example #9: The non-transitory computer-readable medium of any o Examples #1-8, wherein the first fingerprint comprises a multi-dimensional vector including the hashed metadata and the hashed layers.

Example #10: The non-transitory computer-readable medium of any of Examples #1-9, wherein the operations further comprise generating the first fingerprint by: iteratively combining different amounts and types of hashed content associated with the image file to produce a plurality of fingerprint candidates; determining that a particular fingerprint candidate, from among the plurality of fingerprint candidates, is most similar to the second fingerprint as compared to a remainder of the plurality of fingerprint candidates; and selecting the particular fingerprint candidate for use as the first fingerprint.

Example #11: The non-transitory computer-readable medium of any of Examples #1-10, generating access permission hashes by applying a third fuzzy hashing function to access permissions associated with the image file; and generating the first fingerprint based on the access permission hashes.

Example #12: A system comprising: a processor; and a memory including program code that is executable by processor for causing the processor to perform operations including: receiving an image file for deploying software, the image file containing metadata and a plurality of layers normalizing, by a normalizing function, the metadata to produce normalized metadata; generating hashed metadata by applying a first hashing function to the normalized metadata; generating hashed layers by applying a second fuzzy hashing function to the plurality of layers of the image file; generating a first fingerprint for the image file based on the hashed metadata and the hashed layers; and determining a similarity between the first fingerprint and a second fingerprint by comparing the first fingerprint to the second fingerprint.

Example #13: The system of Example #12, wherein the second fingerprint is associated with the image file, and wherein the operations further comprise: in response to determining that the similarity between the first fingerprint and the second fingerprint meets or exceeds a predefined similarity threshold, storing information in a database indicating that the software is running in a computing cluster.

Example #14: The system of any of Examples #12-13, wherein the second fingerprint is associated with the image file, and wherein the operations further comprise: in response to determining that the similarity between the first fingerprint and the second fingerprint is below a predefined similarity threshold, displaying, to a user, a warning indicating the image file is not recognized.

Example #15: The system of any of Examples #12-14, wherein the metadata includes a name, a version, and a timestamp associated with the image file.

Example #16: The system of any of Examples #12-15, wherein the second fingerprint is associated with the image file, and wherein the operations further comprise: generating file path hashes by applying a third fuzzy hashing function to file paths associated with a filesystem of the image file; and generating the first fingerprint based on the file path hashes.

Example #17: A method comprising: receiving, by one or more processors, an image file for deploying software, the image file containing metadata and a plurality of layers; normalizing, by the one or more processors, the metadata to produce normalized metadata; generating, by the one or more processors, hashed metadata by applying a first fuzzy hashing function to the normalized metadata; generating, by the one or more processors, hashed layers by applying a second fuzzy hashing function to the plurality of layers of the image file; generating, by the one or more processors, a first fingerprint for the image file based on the hashed metadata and the hashed layers; and determining, by the one or more processors, a similarity between the first fingerprint and a second fingerprint by comparing the first fingerprint to the second fingerprint.

Example #18: The method of Example #17, wherein the second fingerprint is associated with the image file, and wherein the method further comprises: in response to determining that the similarity between the first fingerprint and the second fingerprint meets or exceeds a predefined similarity threshold, storing, by the one or more processors, information in a database indicating that the software is running in a computing cluster.

Example #19: The method of any of Examples #17-18 wherein the second fingerprint is associated with the image file, and wherein the method further comprises: in response to determining that the similarity between the first fingerprint and the second fingerprint is below a predefined similarity threshold, displaying, by the one or more processors and to a user, a warning indicating the image file is not recognized.

Example #20: The method of any of Examples #17-19, wherein the metadata includes a name, a version, and a timestamp associated with the image file.

Example #21: A non-transitory computer-readable medium comprising program code that is executable by one or more processors for causing the one or more processors to perform operations including: executing a tracking process for monitoring which software is deployed in a computing cluster, wherein the tracking process involves: receiving image files used to deploy a set of software components in the computing cluster; and for each of the image files: receiving the image file; generating hashed image data by applying a fuzzy hashing function to content of the image file; generating a fingerprint for the image file based on the hashed image data; comparing the fingerprint to a reference set of fingerprints corresponding to known image files to determine whether the image file is a known image file; and storing an identifier of the image file in a first tracking log if the image file is a known image file, or storing the identifier of the image file in a second tracking log if the image file is an unknown image file.

Example #22: The non-transitory computer readable medium of Example #21, wherein the operations further comprise: in response to determining the image file is an unknown image file, notifying a user of the computing cluster that the image file is an unknown image file.

Example #23: The non-transitory computer readable medium of any of Examples #21-22, wherein the operations further comprise: in response to determining the image file is an unknown image file, requesting approval from a user to add the fingerprint to the reference set of fingerprints.

Example #24: The non-transitory computer readable medium of any of Examples #21-23, wherein the known image files are associated with one or more vulnerabilities, and the operations further comprise: outputting a warning that the image file is associated with the one or more vulnerabilities to a user of the computing cluster.

Example #25: The non-transitory computer readable medium of any of Examples #21-24, wherein the operations further comprise: in response to determining that the image file is a known image file, determining that a software component associated with the image file is running within the computing cluster.

Example #26: The non-transitory computer readable medium of any of Examples #21-25, wherein the operations further comprise generating the fingerprint for the image file by: applying a first hashing algorithm to a first type of content of the image file to generate first hashed content; applying a second hashing algorithm to a second type of content of the image file to generate second hashed content, the first type of content being different from the second type of content; and generating the fingerprint by combining the first hashed content and the second hashed content.

Example #27: A system comprising: a processor; and a memory including program code that is executable by processor for causing the processor to perform operations including: executing a tracking process for monitoring which software is deployed in a computing cluster, wherein the tracking process involves: receiving image files used to deploy a set of software components in the computing cluster; and for each of the image files: receiving the image file; generating hashed image data by applying a fuzzy hashing function to content of the image file; generating a fingerprint for the image file based on the hashed image data; comparing the fingerprint to a reference set of fingerprints corresponding to known image files to determine whether the image file is a known image file; and storing an identifier of the image file in a first tracking log if the image file is a known image file, or storing the identifier of the image file in a second tracking log if the image file is an unknown image file.

Example #28: The system of Example #27, wherein the operations further comprise, in response to determining the image file is an unknown image file, notifying a user of the computing cluster that the image file is an unknown image file.

Example #29: The system of any of Examples #27-28, wherein the operations further comprise: in response to determining the image file is an unknown image file, requesting approval from a user to add the fingerprint to the reference set of fingerprints.

Example #30: The system of any of Examples #27-29, wherein the known image files are associated with one or more vulnerabilities, and the operations further comprise: outputting a warning that the image file is associated with the one or more vulnerabilities to a user of the computing cluster.

Example #31: A method comprising, executing, by a processor, a tracking process for monitoring which software is deployed in a computing cluster, wherein the tracking process involves: receiving, by the processor, image files used to deploy a set of software components in the computing cluster; and for each of the image files: receiving, by the processor, the image file; generating, receiving, by the processor, hashed image data by applying a fuzzy hashing function to content of the image file; generating, by the processor, a fingerprint for the image file based on the hashed image data; comparing, by the processor, the fingerprint to a reference set of fingerprints corresponding to known image files to determine whether the image file is a known image file; and storing, by the processor, an identifier of the image file in a first tracking log if the image file is a known image file, or storing the identifier of the image file in a second tracking log if the image file is an unknown image file.

Example #32: The method of Example #31, wherein the tracking process involves: in response to determining the image file is an unknown image file, notifying a user of the computing cluster that the image file is an unknown image file.

Example #33: The method of any of Examples #31-32, wherein the tracking process further involves: in response to determining the image file is an unknown image file, requesting approval from a user to add the fingerprint to the reference set of fingerprints.

Example #34: The method of any of Examples #31-33, wherein the tracking process further involves: outputting a warning that the image file is associated with the one or more vulnerabilities to a user of the computing cluster.

Example #35: A system comprising: means for receiving an image file for deploying software, the image file containing metadata and a plurality of layers; means for normalizing the metadata to produce normalized metadata; means for generating hashed metadata by applying a first fuzzy hashing function to the normalized metadata; means for generating hashed layers by applying a second fuzzy hashing function to the plurality of layers of the image file; means for generating a first fingerprint for the image file based on the hashed metadata and the hashed layers; and means for determining a similarity between the first fingerprint and a second fingerprint by comparing the first fingerprint to the second fingerprint.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other examples to yield further examples.

The invention claimed is:

1. A non-transitory computer-readable medium comprising program code that is executable by one or more processors for causing the one or more processors to perform operations including:
   receiving an image file for deploying software, the image file containing metadata and a plurality of layers;
   normalizing the metadata to produce normalized metadata;

generating hashed metadata by applying a first fuzzy hashing function to the normalized metadata;

generating hashed layers by applying a second fuzzy hashing function to the plurality of layers of the image file;

generating a first fingerprint for the image file based on the hashed metadata and the hashed layers; and determining a similarity between the first fingerprint and a second fingerprint by comparing the first fingerprint to the second fingerprint.

2. The non-transitory computer-readable medium of claim 1, wherein the second fingerprint is associated with the image file, and wherein the operations further comprise:

in response to determining that the similarity between the first fingerprint and the second fingerprint meets or exceeds a predefined similarity threshold, storing information in a database indicating that the software is running in a computing cluster.

3. The non-transitory computer-readable medium of claim 1, wherein the second fingerprint is associated with the image file, and wherein the operations further comprise:

in response to determining that the similarity between the first fingerprint and the second fingerprint is below a predefined similarity threshold, displaying, to a user, a warning indicating the image file is not recognized.

4. The non-transitory computer-readable medium of claim 1, wherein the metadata includes a name, a version, and a timestamp associated with the image file.

5. The non-transitory computer-readable medium of claim 1, wherein the operations further comprise:

generating file path hashes by applying a third fuzzy hashing function to file paths associated with a filesystem of the image file; and generating the first fingerprint based on the file path hashes.

6. The non-transitory computer-readable medium of claim 1, wherein the operations further comprise:

generating file hashes by applying a third fuzzy hashing function to individual files in a filesystem of the image file; and generating the first fingerprint based on the file hashes.

7. The non-transitory computer-readable medium of claim 1, wherein the first fuzzy hashing function is the same as the second fuzzy hashing function.

8. The non-transitory computer-readable medium of claim 1, wherein the first fuzzy hashing function is different from the second fuzzy hashing function.

9. The non-transitory computer-readable medium of claim 1, wherein the first fingerprint comprises a multi-dimensional vector including the hashed metadata and the hashed layers.

10. The non-transitory computer-readable medium of claim 1, wherein the operations further comprise generating the first fingerprint by:

iteratively combining different amounts and types of hashed content associated with the image file to produce a plurality of fingerprint candidates;

determining that a particular fingerprint candidate, from among the plurality of fingerprint candidates, is most similar to the second fingerprint as compared to a remainder of the plurality of fingerprint candidates; and selecting the particular fingerprint candidate for use as the first fingerprint.

11. The non-transitory computer-readable medium of claim 1, wherein the operations further comprise:

generating access permission hashes by applying a third fuzzy hashing function to access permissions associated with the image file; and generating the first fingerprint based on the access permission hashes.

12. A system comprising:

a processor; and a memory including program code that is executable by processor for causing the processor to perform operations including:

receiving an image file for deploying software, the image file containing metadata and a plurality of layers normalizing, by a normalizing function, the metadata to produce normalized metadata;

generating hashed metadata by applying a first fuzzy hashing function to the normalized metadata;

generating hashed layers by applying a second fuzzy hashing function to the plurality of layers of the image file;

generating a first fingerprint for the image file based on the hashed metadata and the hashed layers; and determining a similarity between the first fingerprint and a second fingerprint by comparing the first fingerprint to the second fingerprint.

13. The system of claim 12, wherein the second fingerprint is associated with the image file, and wherein the operations further comprise:

in response to determining that the similarity between the first fingerprint and the second fingerprint meets or exceeds a predefined similarity threshold, storing information in a database indicating that the software is running in a computing cluster.

14. The system of claim 12, wherein the second fingerprint is associated with the image file, and wherein the operations further comprise:

in response to determining that the similarity between the first fingerprint and the second fingerprint is below a predefined similarity threshold, displaying, to a user, a warning indicating the image file is not recognized.

15. The system of claim 12, wherein the metadata includes a name, a version, and a timestamp associated with the image file.

16. The system of claim 12, wherein the second fingerprint is associated with the image file, and wherein the operations further comprise:

generating file path hashes by applying a third fuzzy hashing function to file paths associated with a filesystem of the image file; and generating the first fingerprint based on the file path hashes.

17. A method comprising:

receiving, by one or more processors, an image file for deploying software, the image file containing metadata and a plurality of layers;

normalizing, by the one or more processors, the metadata to produce normalized metadata;

generating, by the one or more processors, hashed metadata by applying a first fuzzy hashing function to the normalized metadata;

generating, by the one or more processors, hashed layers by applying a second fuzzy hashing function to the plurality of layers of the image file;

generating, by the one or more processors, a first fingerprint for the image file based on the hashed metadata and the hashed layers; and determining, by the one or more processors, a similarity between the first fingerprint and a second fingerprint by comparing the first fingerprint to the second fingerprint.

18. The method of claim 17, wherein the second fingerprint is associated with the image file, and wherein the method further comprises:
   in response to determining that the similarity between the first fingerprint and the second fingerprint meets or exceeds a predefined similarity threshold, storing, by the one or more processors, information in a database indicating that the software is running in a computing cluster.

19. The method of claim 17, wherein the second fingerprint is associated with the image file, and wherein the method further comprises:
   in response to determining that the similarity between the first fingerprint and the second fingerprint is below a predefined similarity threshold, displaying, by the one or more processors and to a user, a warning indicating the image file is not recognized.

20. The method of claim 17, wherein the metadata includes a name, a version, and a timestamp associated with the image file.

* * * * *